US012210301B2

(12) United States Patent
Yokoyama et al.

(10) Patent No.: US 12,210,301 B2
(45) Date of Patent: Jan. 28, 2025

(54) IMAGE FORMING APPARATUS

(71) Applicant: CANON KABUSHIKI KAISHA, Tokyo (JP)

(72) Inventors: Ken Yokoyama, Shizuoka (JP); Masaru Tsukada, Kanagawa (JP); Hiroto Hasegawa, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/474,069

(22) Filed: Sep. 25, 2023

(65) Prior Publication Data

US 2024/0103410 A1 Mar. 28, 2024

(30) Foreign Application Priority Data

Sep. 28, 2022 (JP) ................................ 2022-154906

(51) Int. Cl.
*G03G 15/16* (2006.01)

(52) U.S. Cl.
CPC ....... *G03G 15/1675* (2013.01); *G03G 15/162* (2013.01); *G03G 15/1685* (2013.01); *G03G 2215/1614* (2013.01)

(58) Field of Classification Search
CPC ............. G03G 15/1675; G03G 15/162; G03G 15/1685
See application file for complete search history.

(56) References Cited

U.S. PATENT DOCUMENTS

| | | | | |
|---|---|---|---|---|
| 10,684,577 | B1 | 6/2020 | Bennett | |
| 2018/0032001 | A1* | 2/2018 | Yoshida | G03G 15/5054 |
| 2018/0181051 | A1* | 6/2018 | Yoshida | G03G 15/161 |
| 2018/0217522 | A1* | 8/2018 | Yoshida | G03G 9/09 |

FOREIGN PATENT DOCUMENTS

| | | | |
|---|---|---|---|
| JP | 2003091132 | A | 3/2003 |
| JP | 2006047487 | A | 2/2006 |
| JP | 2018036624 | A | 3/2018 |

* cited by examiner

*Primary Examiner* — Jessica L Eley
(74) *Attorney, Agent, or Firm* — Canon U.S.A., Inc. IP Division

(57) ABSTRACT

An image forming apparatus includes an image carrier to carry a toner image, intermediate, primary, and secondary transfer members, and a voltage application member. The voltage application member applies a voltage to the image carrier. The secondary transfer member is in contact with an outer circumferential surface of the intermediate transfer member. The toner image carried on the image carrier is primarily transferred onto the intermediate transfer member in a state where the voltage application member applies the voltage to the image carrier. The intermediate transfer member has a volume resistivity from $5\times10^7$ Ω·cm to $2\times10^{11}$ Ω·cm inclusive. A relation $\rho s1/\rho s2 \geq 1.5$ is satisfied, where ρs1 denotes a surface resistivity which is measured from the outer circumferential surface of the intermediate transfer member and ρs2 denotes a surface resistivity which is measured from an inner circumferential surface of the intermediate transfer member.

13 Claims, 9 Drawing Sheets

IMAGE FORMING APPARATUS

BACKGROUND

Field

The present disclosure relates to an image forming apparatus using an electrophotographic process, such as a laser beam printer, copying machine, and facsimile.

Description of the Related Art

Typical image forming apparatuses, such as copying machines and laser beam printers, are known to use an intermediate transfer belt as an intermediate transfer member.

In a primary transfer process, an image forming apparatus transfers a toner image formed on the surface of a photosensitive drum serving as an image carrier onto an intermediate transfer belt by applying a voltage to a primary transfer roller serving as a primary transfer member disposed at a portion facing the photosensitive drum. The image forming apparatus then repetitively performs this primary transfer process for a plurality of color toner images to form a multi-color toner image on the front surface of the intermediate transfer belt. Subsequently, as a secondary transfer process, the apparatus collectively transfers the multi-color toner image formed on the front surface of the intermediate transfer belt onto the surface of a recording material, such as paper, by applying a voltage to a secondary transfer member. The toner image transferred onto the surface of the recording material is then fixed thereto by a fixing unit, and a color image is formed on the recording material.

The specification of U.S. Pat. No. 10,684,577 discloses a configuration for performing a primary transfer process in which a primary transfer roller is grounded to a metal frame of an image forming apparatus and a photosensitive drum is applied with a voltage from a power source.

SUMMARY

According to an aspect of the present disclosure, an image forming apparatus includes an image carrier configured to carry a toner image, an intermediate transfer member onto which the toner image carried on the image carrier is transferred, wherein the intermediate transfer member is rotatable and endless, a primary transfer member configured to perform primary transfer of the toner image carried on the image carrier onto the intermediate transfer member, wherein the primary transfer member is disposed in a state where the primary transfer member is electrically grounded at a position corresponding to the image carrier across the intermediate transfer member, a voltage application member configured to apply a voltage to the image carrier, and a secondary transfer member in contact with an outer circumferential surface of the intermediate transfer member, wherein the secondary transfer member is configured to perform secondary transfer of the toner image carried on the intermediate transfer member onto a transfer material, wherein the toner image carried on the image carrier is primarily transferred onto the intermediate transfer member in a state where the voltage application member applies the voltage to the image carrier, wherein the intermediate transfer member has a volume resistivity from $5\times10^7$ Ω·cm to $2\times10^{11}$ Ω·cm inclusive, and wherein a relation $\rho s1/\rho s2 \geq 1.5$ is satisfied, where $\rho s1$ denotes a surface resistivity which is measured from the outer circumferential surface of the intermediate transfer member and $\rho s2$ denotes a surface resistivity which is measured from an inner circumferential surface of the intermediate transfer member.

Further features of the present disclosure will become apparent from the following description of exemplary embodiments with reference to the attached drawings.

DESCRIPTION OF THE EMBODIMENTS

Preferred exemplary embodiments of the present disclosure will be exemplarily described in detail below with reference to the accompanying drawings. However, sizes, materials, shapes, and relative arrangements of components according to the following exemplary embodiments are to be modified as appropriate depending on the configuration of an apparatus to which the present disclosure is applied and other various conditions. Therefore, unless otherwise specifically described, the scope of the present disclosure is not limited to the following exemplary embodiments.

[Overall Configuration of Image Forming Apparatus]

Figure 1:
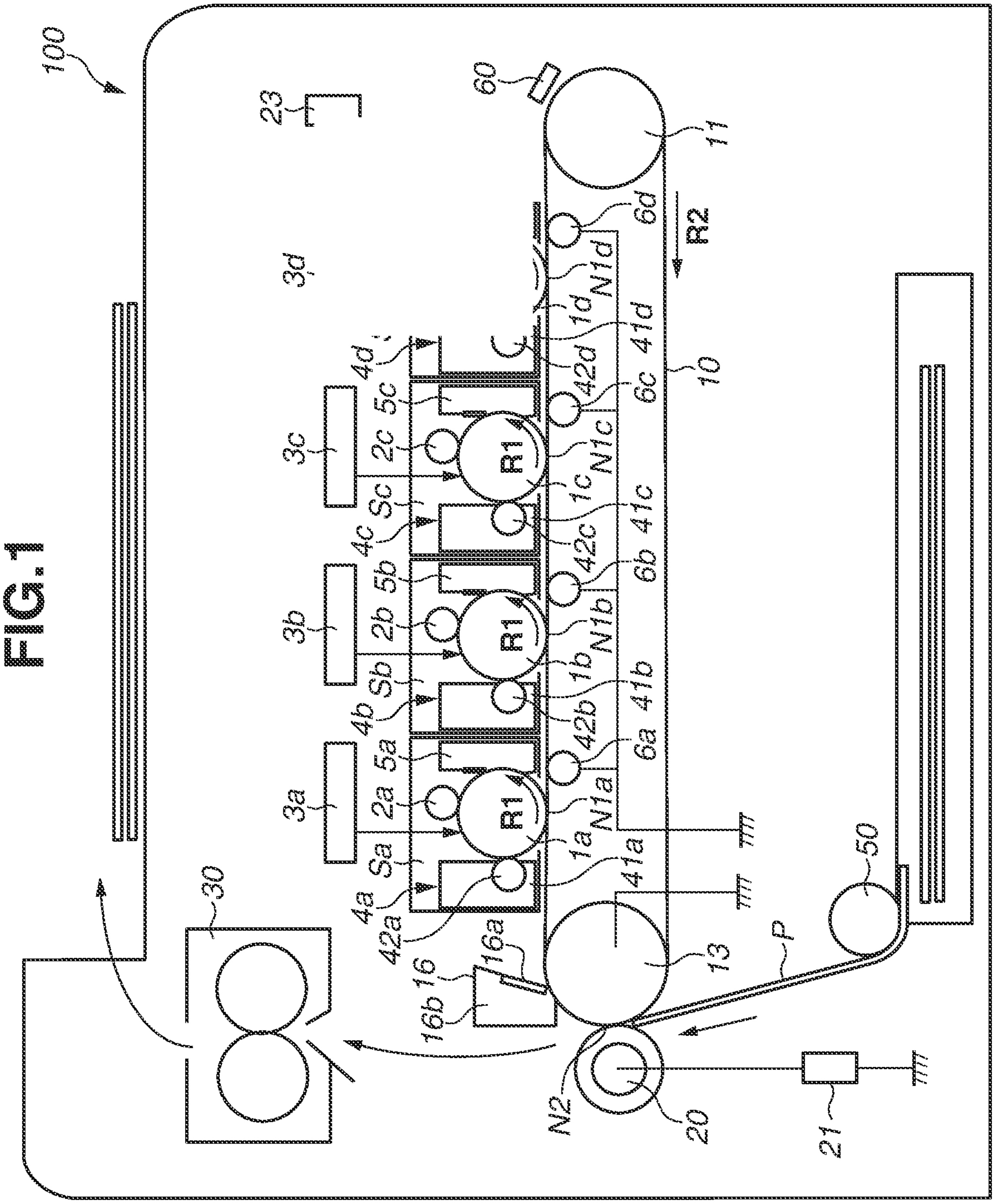
FIG. 1 is a schematic sectional view illustrating a configuration of an image forming apparatus according to a first exemplary embodiment.

FIG. 1 is a sectional view schematically illustrating a configuration of an image forming apparatus 100 according to a first exemplary embodiment. The image forming apparatus 100 is what is called a tandem-type image forming apparatus including a plurality of image forming units Sa to Sd. The first image forming unit Sa forms an image by using yellow (Y) toner, the second image forming unit Sb forms an image by using magenta (M) toner, the third image forming unit Sc forms an image by using cyan (C) toner, and the fourth image forming unit Sd forms an image by using black (Bk) toner. These four different image forming units are disposed in a row at constant intervals and have substantially the common configuration except the color of the stored toner. Thus, in the following descriptions, configurations common to the four image forming units of the image forming apparatus 100 according to the first exemplary embodiment will be described below with reference to the first image forming unit Sa, and descriptions of the second to the fourth image forming units Sb to Sd will be omitted.

The first image forming unit Sa includes a photosensitive drum 1*a* as an image carrier, a charge roller 2*a* as a charge member, a developing unit 4*a*, and a drum cleaning unit 5*a*.

The photosensitive drum 1*a* is rotatably driven at a predetermined process speed (200 mm/second according to the present exemplary embodiment) in the direction of the arrow R1 in FIG. 1. The developing unit 4*a* includes a developing container 41*a* for storing yellow toner, and a developing roller 42*a* as a developing member for carrying the yellow toner stored in the developing container 41*a* and developing a yellow toner image on the photosensitive drum 1*a*. The drum cleaning unit 5*a* is means for collecting the toner adhering to the photosensitive drum 1*a*. The drum cleaning unit 5*a* includes a cleaning blade in contact with the photosensitive drum 1*a*, and a waste toner box for storing the toner removed from the photosensitive drum 1*a* by the cleaning blade.

When the image forming operation is started in response to a controller 274 (illustrates it in FIG. 2) serving as a control unit having received an image signal, the photosensitive drum 1*a* is rotatably driven. In the rotation process, the photosensitive drum 1*a* is uniformly charged to a predetermined potential (dark portion potential Vd) with a predetermined polarity (negative polarity according to the present exemplary embodiment) by the charge roller 2*a* and exposed to light according to the image signal by an exposure unit 3*a*. Thus, an electrostatic latent image corresponding to the yellow color component image of the target color image is formed. The toner stored in the developing container 41*a* having the negative charge polarity is developed from the developing roller 42*a* to the photosensitive drum 1*a* at the developing position to be visualized as a yellow toner image (hereinafter simply referred to as a toner image). The developing roller 42*a* rotates in the same direction as the photosensitive drum 1*a* at a speed of 300 mm/second which is 1.5 times the speed of the photosensitive drum 1*a* to develop an image on the photosensitive drum 1*a*.

An intermediate transfer belt 10 which is a seamlessly (endlessly) movable intermediate transfer member is disposed so as to come into contact with the photosensitive drums 1*a* to 1*d* of the image forming units Sa to Sd, respectively, and stretched by two different shafts, a stretching roller 11 and a secondary transfer counter roller 13 serving as a drive roller. The intermediate transfer belt 10 is stretched with a tension of a total pressure of 58.8 N by the stretching roller 11, and moves in the direction of the arrow R2 in FIG. 1 by the rotation of the secondary transfer counter roller 13 driven by a driving force.

When the toner image formed on the photosensitive drum 1*a* passes through a primary transfer portion N1*a* at which the photosensitive drum 1*a* and the intermediate transfer belt 10 are in contact with each other, the toner image is primarily transferred onto the intermediate transfer belt 10 by a negative voltage applied to the photosensitive drum 1*a* from a primary transfer power source 23 (voltage application member). Then, residual toner on the photosensitive drum 1*a*, in other words, toner not having been primarily transferred onto the intermediate transfer belt 10, is collected by the drum cleaning unit 5*a*.

Similarly, a magenta toner image of the second color, a cyan toner image of the third color, and a black toner image of the fourth color are formed on the corresponding image forming units and then sequentially primarily transferred onto the intermediate transfer belt 10 in an overlapped way. Thus, a four-color toner image corresponding to the target color image is formed on the intermediate transfer belt 10. Subsequently, when the four-color toner image carried on the intermediate transfer belt 10 passes through the secondary transfer portion N2 at which the secondary transfer roller 20 and the intermediate transfer belt 10 are in contact with each other, the four-color image is secondarily transferred at one time onto the surface of the transfer material (recording material) P, such as paper, supplied by a sheet feeding unit 50.

The secondary transfer roller 20 having an 18 mm outer diameter is formed of a nickel-plated steel bar with an 8 mm outer diameter coated by a foamed sponge material consisting primarily of nitrile butadiene rubber (NBR) and epichlorohydrin rubber, adjusted to a volume resistivity of $10^8$ Ω·cm and a thickness of 5 mm. The rubber hardness of the foamed sponge material is measured by using the Asker Rubber Hardness Meter Type C (from KOBUNSHI KEIKI CO., LTD.) conforming to Japanese Industrial Standards (JIS) K 7312, and is 30 degrees with a load of 4.9 N. The secondary transfer roller 20 in contact with the outer circumferential surface of the intermediate transfer belt 10 is pressed onto the secondary transfer counter roller 13 disposed at a position facing the secondary transfer roller 20 via the intermediate transfer belt 10, with a pressure of 49.0 N to form the secondary transfer portion N2.

When the secondary transfer roller 20 is driven and rotated according to the rotation of the intermediate transfer belt 10, and is applied with a voltage from the secondary transfer power source 21, a current flows from the secondary transfer roller 20 to the secondary transfer counter roller 13. Thus, the toner image carried on the intermediate transfer belt 10 is secondarily transferred onto the transfer material P at the secondary transfer portion N2. When the toner image is secondarily transferred onto the transfer material P, the voltage to be applied to the secondary transfer roller 20 from the secondary transfer power source 21 is controlled so that a constant current flows from the secondary transfer roller 20 to the secondary transfer counter roller 13 via the intermediate transfer belt 10. The magnitude of the current for performing the secondary transfer is predetermined in accordance with the ambient environment where the image forming apparatus 100 is installed and the type of the transfer material P. The secondary transfer power source 21 is connected to the secondary transfer roller 20 and applies the transfer voltage to the secondary transfer roller 20.

The transfer material P with the four-color toner image transferred thereon via the secondary transfer is then pressurized and heated by a fixing unit 30. The four-color toner melts and mixes, and the four-color toner image is fixed to the transfer material P. Meanwhile, the toner remaining on the intermediate transfer belt 10 after the secondary transfer is cleaned and removed by a belt cleaning unit 16 disposed downstream of the secondary transfer portion N2 in the moving direction of the intermediate transfer belt 10. The belt cleaning unit 16 includes a cleaning blade 16*a* as a contact member in contact with the outer circumferential surface of the intermediate transfer belt 10 at a position facing the secondary transfer counter roller 13, and a waste toner container 16*b* for storing the toner collected by the cleaning blade 16*a*.

With the above-described operation, a full-color image is formed by the image forming apparatus 100.

Figure 2:
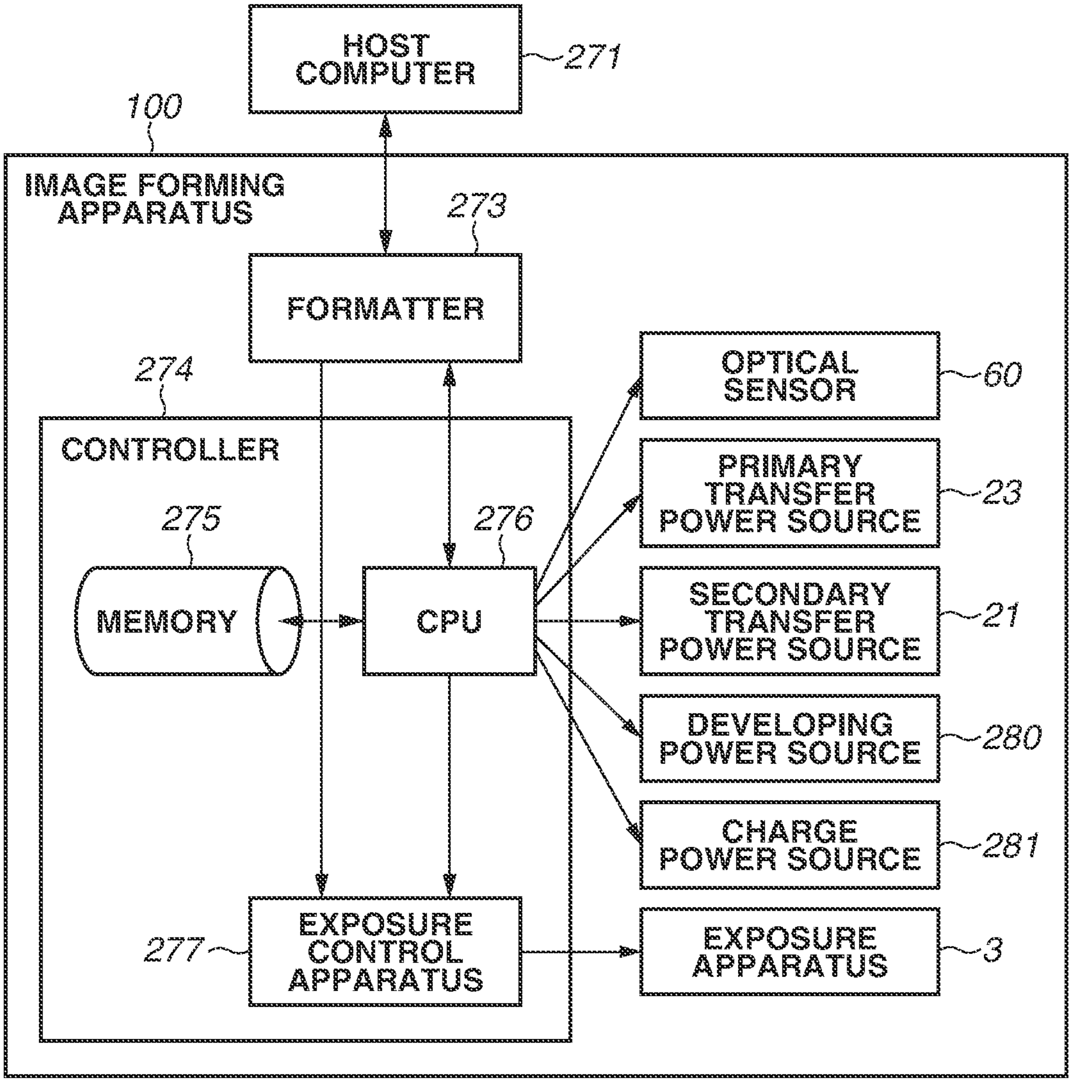
FIG. 2 is a schematic diagram illustrating control blocks of the image forming apparatus according to the first exemplary embodiment.

Control according to the present exemplary embodiment will be described below with reference to FIG. 2. FIG. 2 is a control block diagram illustrating control of the operations of the image forming apparatus 100.

As illustrated in FIG. 2, a host computer 271 issues a printing instruction to a formatter 273 serving as a conversion unit in the image forming apparatus 100 and transmits image data of a print image to the formatter 273. The formatter 273 receives the image data of RGB (red, green, and blue) colors or YMCBk (yellow, magenta, cyan, and black) colors from the host computer 271 and converts the image data into exposure data of different colors according to the mode specified by the host computer 271. The exposure data resulting from the conversion has a resolution of 600 dpi. There are various modes based on the combinations of the sheet type, sheet size, and image quality. The image forming apparatus 100 is controlled to select optimum image forming conditions according to the mode specified by the host computer 271.

The formatter 273 transfers the exposure data resulting from the conversion to an exposure control unit 277 which is an exposure control apparatus in the controller 274 (control unit). The exposure control unit 277 controls the exposure unit 3 based on an instruction from a central processing unit (CPU) 276. In the image forming apparatus 100, the image halftone is controlled with the area gradation based on the ON/OFF state of the exposure data. When the CPU 276 receives a printing instruction from the formatter 273, the CPU 276 starts an image forming sequence. The controller 274 includes the CPU 276 and a memory 275 and performs programmed operations. The CPU 276 controls a charge power source 281, a developing power source 280, and the primary transfer power source 23 to control the formation of an electrostatic latent image and the transfer of a developed toner image, thus performing the image forming process.

In performing the correction control for correcting the position and density of the image to be formed, the CPU 276 also performs a process of receiving a signal from an optical sensor 60 which is a detection unit. In the image correction control, the optical sensor 60 measures the amount of reflected light from a test patch (detection toner image) formed at a position on the outer circumferential surface of the intermediate transfer belt 10 at a position facing the optical sensor 60. The signal detected by the optical sensor 60 is subjected to the analog-to-digital (A/D) conversion via the CPU 276 and then stored in the memory 275. The controller 274 performs calculations by using the detection result by the optical sensor 60 to correct the image.

[Configuration of Primary Transfer Portion]

Figure 3:
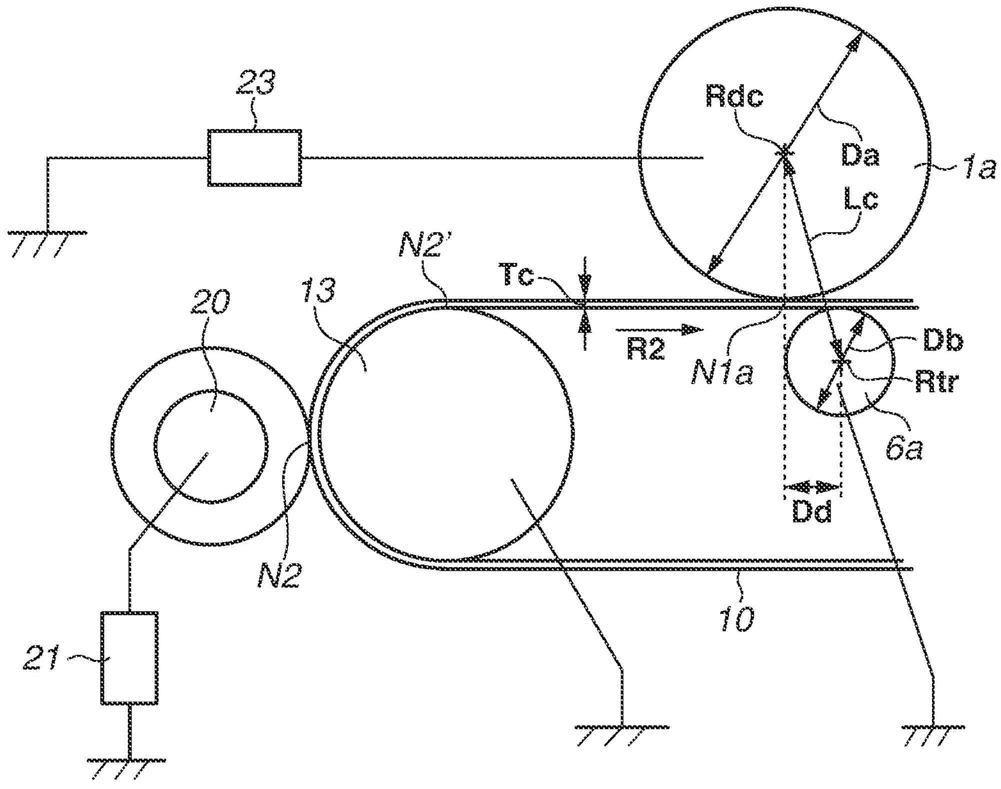
FIG. 3 is a schematic diagram illustrating a configuration of a transfer unit according to the first exemplary embodiment.

FIG. 3 is a schematic diagram illustrating a configuration of the primary transfer portion viewed from the rotation axis direction of the photosensitive drum 1*a*. The primary transfer portion N1*a* in FIG. 3 is the primary transfer portion closest to the secondary transfer portion N2. The configurations of the photosensitive drum 1*a* included in the first image forming unit Sa, the intermediate transfer belt 10, and the primary transfer roller 6*a*, and their disposal relation will be described below with reference to FIG. 3.

According to the present exemplary embodiment, the primary transfer roller 6*a* serving as a primary transfer member is a metal roller that is made of metal and is not coated by an elastic material, such as rubber. As illustrated in FIG. 3, the primary transfer roller 6*a* is disposed downstream of the primary transfer portion N1*a* in the rotational direction (moving direction) of the intermediate transfer belt 10 at the primary transfer portion N1*a*, where the photosensitive drum 1*a* and the intermediate transfer belt 10 are in contact with each other.

More specifically, when viewed from the rotational axis direction of the photosensitive drum 1*a*, the rotation center Rtr of the primary transfer roller 6*a* is located downstream of the rotation center Rdc of the photosensitive drum 1*a* in the moving direction of the intermediate transfer belt 10 at the primary transfer portion N1*a*. The distance from the rotation center Rdc of the photosensitive drum 1*a* to the rotation center Rtr of the primary transfer roller 6*a* along the moving direction of the intermediate transfer belt 10 is a distance Dd. More specifically, the primary transfer roller 6*a* is disposed at a position corresponding to the photosensitive drum 1*a* across the intermediate transfer belt 10 in a state where the rotation center Rtr is offset relative to the rotation center Rdc or the primary transfer portion N1*a* serving as a contact portion between the photosensitive drum 1*a* and the intermediate transfer belt 10.

In the configuration of the present exemplary embodiment, a distance Lc which is the length of the straight line connecting the rotation centers Rdc and Rtr satisfies the following inequality (1):

$$Lc>(Da/2)+(Db/2)+Tc \qquad (1),$$

where Da denotes the diameter of the photosensitive drum 1*a*, Db denotes the diameter of the primary transfer roller 6*a*, and Tc denotes the thickness of the intermediate transfer belt 10.

If the relation of the inequality (1) is satisfied over a predetermined region in the longitudinal direction of the photosensitive drum 1*a* orthogonal to the moving direction of the intermediate transfer belt 10, it is possible for the primary transfer roller 6*a* to stably come into contact with the back surface (inner circumferential surface) of the intermediate transfer belt 10.

According to the present exemplary embodiment, the primary transfer roller 6*a* is a roller member (transfer roller) formed of a straight round bar made of a nickel-plated stainless-steel material having an outer diameter of 6 mm. The primary transfer roller 6*a* is driven and rotated according to the rotation of the intermediate transfer belt 10. The photosensitive drum 1*a* has an outer diameter of 24 mm and has an aluminum cylinder, serving as a base material, which is coated by thin films having different functions, such as a conducting layer, an electric charge generation layer, and an electric charge transport layer. In the configuration of the present exemplary embodiment, the distance Dd between the photosensitive drum 1*a* and the primary transfer roller 6*a* is 3.0 mm. The photosensitive drum 1*a* is applied with a negative voltage from the inner side of the aluminum cylinder by the primary transfer power source 23. Thus, a current flows from the primary transfer roller 6*a* toward the photosensitive drum 1*a* via the intermediate transfer belt 10.

Figure 4:
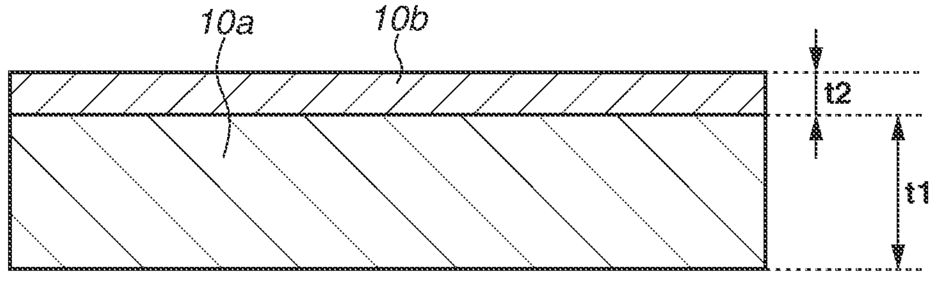
FIG. 4 is a sectional view schematically illustrating an intermediate transfer belt according to the first exemplary embodiment.

The intermediate transfer belt 10 having a configuration which is peculiar to the present exemplary embodiment will be described below. FIG. 4 is a sectional view schematically illustrating the intermediate transfer belt 10 according to the present exemplary embodiment.

The intermediate transfer belt 10 has a circumference of 700 mm and a thickness of 90 μm and includes a base layer 10*a* as a first layer and a surface layer 10*b* as a second layer. The base layer 10*a* includes endless polyethylene naphthalate (PEN) containing an ion conducting agent as a conducting agent. The surface layer 10*b* includes acrylic resin containing a metallic oxide as a conducting agent. As illustrated in FIG. 4, the intermediate transfer belt 10 according to the present exemplary embodiment has two layers: the base layer 10*a* having a thickness t1 and the surface layer 10*b* having a thickness t2, where t1 is equal to 87 μm and t2 is equal to 3 μm.

While the present exemplary embodiment uses PEN as the material of the base layer 10*a* of the intermediate transfer belt 10, other materials are also applicable. For example, materials, such as polyester, acrylonitrile-butadiene-styrene copolymer (ABS), polybutylene naphthalate (PBN), and their mixed resins are also useable. While the present exemplary embodiment uses acrylic resin as the material of the surface layer 10*b* of the intermediate transfer belt 10, other materials, such as polyester, are also useable.

For the intermediate transfer belt 10, the volume resistivity measured from the surface layer 10*b*, the surface resistivity on the front surface measured from the surface layer 10*b*, and the surface resistivity on the back surface measured from the base layer 10*a* are prescribed as suitable resistance values.

The volume resistivity is measured by using the Hiresta-UP (MCP-HT450) together with the Ring Probe Type UR (Type MCP-HTP12) from Mitsubishi Chemical Corporation. The metal surface of the Register Table UFL is used as the probe opposing electrode. The surface resistivity is measured by using the same measuring instrument as that used in the measurement of the volume resistivity with the Teflon (registered trademark) surface of the Register Table UFL as the probe opposing electrode. Various resistivities were measured in an environment with an indoor temperature of 23° C. and an indoor humidity of 50% after the intermediate transfer belt 10 was let stand for at least one day in the relevant environment.

The volume resistivity of the intermediate transfer belt 10 was measured with an applied voltage of 250 V and a measuring time of 10 seconds in a state where the probe was placed on the front surface (outer circumferential surface) of the intermediate transfer belt 10 with an applied pressure of 9.8 N and the probe opposing electrode was disposed on the back surface (inner circumferential surface) of the intermediate transfer belt 10. The volume resistivity is the resistance value in the thickness direction of the intermediate transfer belt 10.

The surface resistivity of the intermediate transfer belt 10 was measured for each of the back surface (inner circumferential surface) where the base layer 10*a* was disposed and the front surface (outer circumferential surface) where the surface layer 10*b* was disposed. The surface resistivity of the back surface (inner circumferential surface) where the base layer 10*a* was disposed was measured in a state where the probe was placed on the back surface (inner circumferential surface) of the intermediate transfer belt 10 and the probe opposing electrode was disposed on the front surface (outer circumferential surface) thereof. The surface resistivity of the front surface (outer circumferential surface) where the surface layer 10*b* was disposed was measured in a state where the probe was placed on the front surface (outer circumferential surface) of the intermediate transfer belt 10 and the probe opposing electrode was disposed on the back surface (inner circumferential surface) thereof. Each measurement was conducted with an applied voltage of 250 V and a measuring time of 10 seconds in a state where the probe was placed on the relevant surface of the intermediate transfer belt 10 with an applied pressure of 9.8 N.

As a result of the measurement under the above-described conditions, a volume resistivity ρv of the intermediate transfer belt 10 according to the present exemplary embodiment was $2.50\times10^{10}$ (Ω·cm). A surface resistivity ρs1 measured from the front surface was $2.20\times10^{11}$ (Ω/sq.), and a surface resistivity ρs2 measured from the back surface was $5.00\times10^{9}$ (Ω/sq.). The ratio of the surface resistivity of the front surface of the intermediate transfer belt 10 to that of the back surface thereof, ρs1/ρs2, is about 44. This means that the surface resistivity measured from the front surface is higher than that measured from the back surface.

Figure 5A:
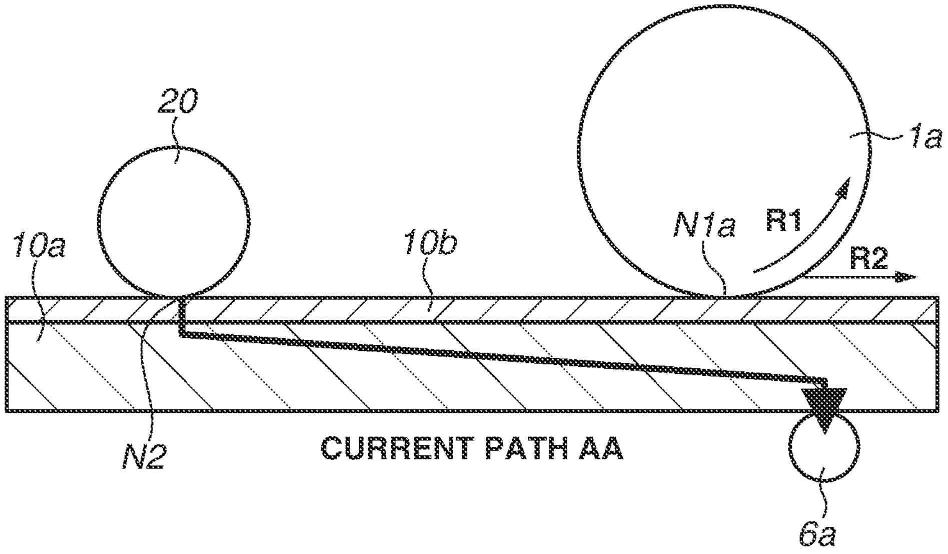
FIGS. 5A and 5B are each a schematic diagram illustrating transfer current paths according to the first exemplary embodiment.
Figure 5B:
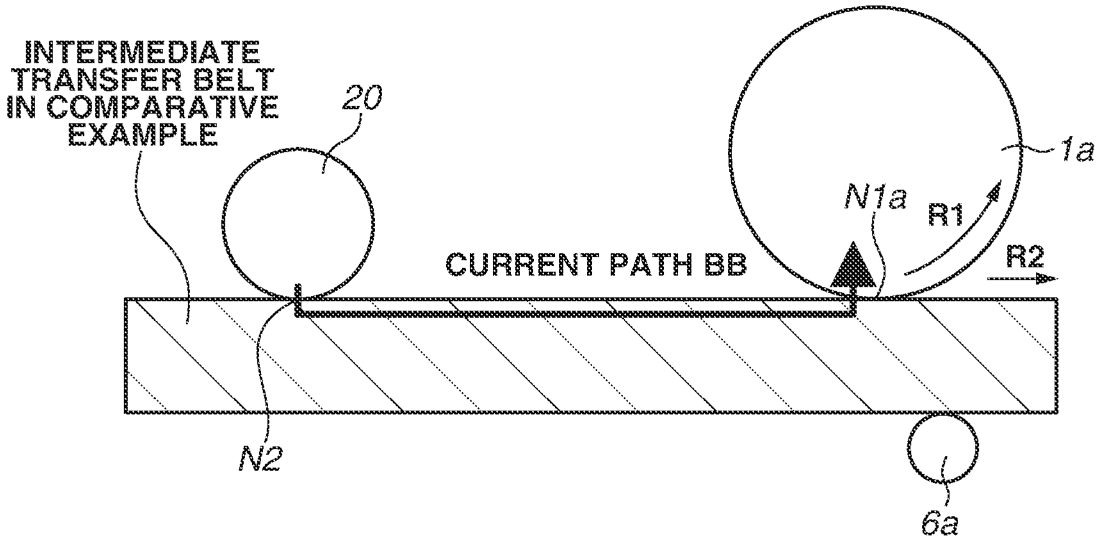

A reason the surface resistivity ρs1 measured from the surface layer 10*b* is set high will be described below with reference to FIGS. 5A, 5B, 6A and 6B. FIG. 5A is a schematic diagram illustrating the path of the current that may flow at the secondary transfer portion N2 and the primary transfer portion N1*a* near the secondary transfer portion N2 according to the present exemplary embodiment. FIG. 5B is a schematic diagram illustrating the path of the current that may flow around a secondary transfer portion in the configuration of a comparative example. In the configuration of the comparative example, an intermediate transfer belt includes only the base layer 10*a* according to the present exemplary embodiment and does not have the surface layer 10*b* on the side that is in contact with the photosensitive drum 1*a*.

Figure 6A:
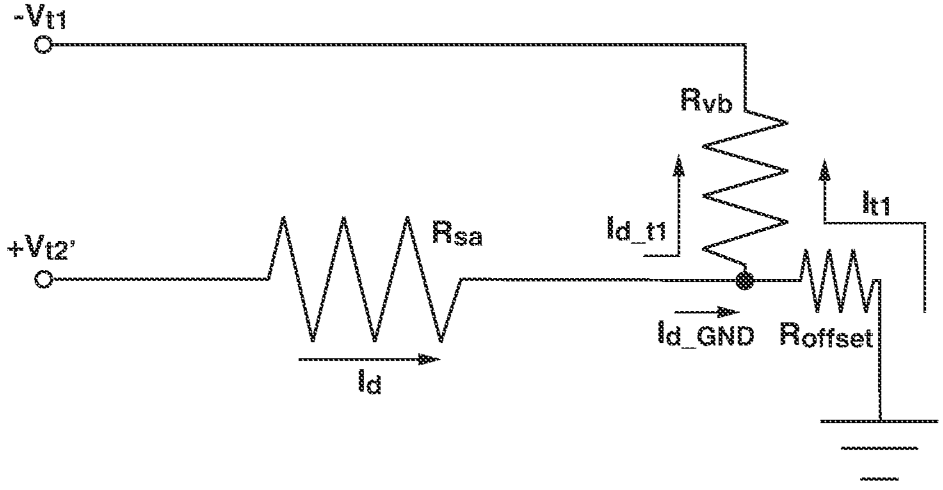
FIGS. 6A and 6B illustrate equivalent circuits of a primary transfer portion and a secondary transfer portion according to the first exemplary embodiment.
Figure 6B:
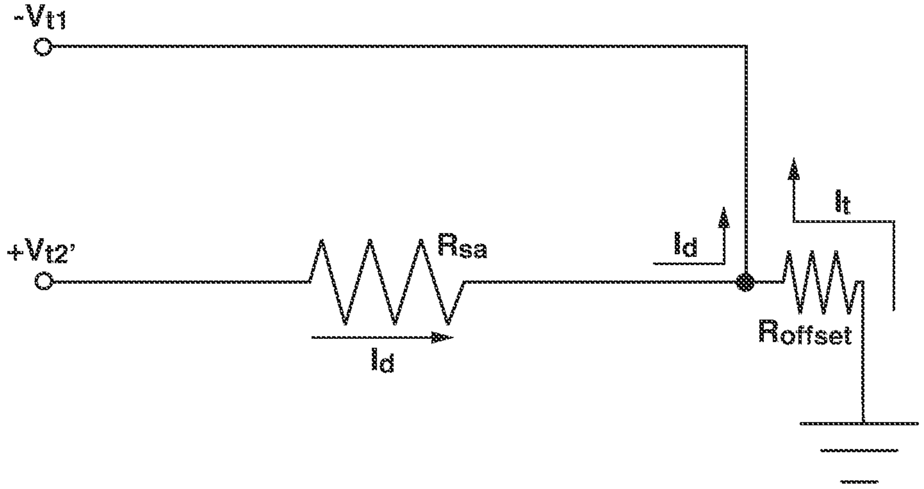

FIG. 6A illustrates an electrical equivalent circuit corresponding to the configuration of the present exemplary embodiment in FIG. 5A. FIG. 6B illustrates an electrical equivalent circuit corresponding to the configuration of the comparative example in FIG. 5B.

The secondary transfer roller 20 is applied with a secondary transfer voltage $V_{t2}$ from the secondary transfer power source 21. At this time, a voltage $V_{t2}'$ illustrated in FIG. 6A is the potential corresponding to the voltage drop of the voltage $V_{t2}$ at the secondary transfer portion N2 and is the potential at a position N2' (illustrated in FIG. 3) downstream of the secondary transfer portion N2 in the moving direction of the intermediate transfer belt 10.

Referring to FIG. 6A, $R_{sa}$ denotes the resistance induced by the intermediate transfer belt 10 corresponding to the portion between the secondary transfer portion N2 and the primary transfer portion N1*a* near the secondary transfer portion N2, and $R_{offset}$ denotes the resistance induced by the intermediate transfer belt 10 corresponding to the primary transfer portion N1*a*. More specifically, $R_{offset}$ denotes the resistance of the intermediate transfer belt 10 corresponding to the distance Dd in FIG. 3.

$V_{t1}$ denotes the primary transfer voltage applied from the primary transfer power source 23. $I_d$ denotes the current flowing from the secondary transfer portion N2 toward the primary transfer portion N1*a* near the secondary transfer portion N2, and $I_{t1}$ denotes the primary transfer current.

<Current Interference at Primary and Secondary Transfer Portions>

A current interference that occurs between the secondary and primary transfer portions in the configuration of the comparative example will be described below with reference to FIGS. 5B and 6B. Referring to FIG. 5B, in response to a voltage being applied to the secondary transfer roller 20, an interference current flows in a current path BB from the secondary transfer roller 20 toward the primary transfer portion N1*a*. More specifically, this interference current flows in the vicinity of the front surface of the intermediate transfer belt 10, which is the shortest distance, along the rotational direction R2 of the intermediate transfer belt 10. The current then flows to the photosensitive drum 1*a* through the primary transfer portion N1*a* which is the contact point between the photosensitive drum 1*a* and the intermediate transfer belt 10.

As illustrated in the equivalent circuit in the configuration of the comparative example in FIG. 6B, a current $I_d$ serving as an interference current flows from the secondary transfer roller 20 to the photosensitive drum 1*a*. In this case, the primary transfer current flowing toward the photosensitive drum 1*a* at the primary transfer portion N1*a* is the sum of the currents $I_{t1}$ and $I_d$ flowing from the primary transfer roller 6*a* grounded to a sheet metal of the image forming apparatus 100 toward the photosensitive drum 1*a*. More specifically, in the configuration of the comparative example, the current $I_d$ serving as an interference current flows, so that the transfer current flowing at the primary transfer portion N1*a* near the secondary transfer portion N2 increases as compared to a case where the interference current does not flow.

If the transfer current flowing at the primary transfer portion N1*a* increases with respect to the target value of the transfer current due to the influence of the interference current, the transfer current may be excessive at the primary transfer portion N1*a*. The excessive transfer current then reverses the polarity of the toner at the primary transfer portion N1*a*, so that the toner may be reversely transferred (re-transferred) from the intermediate transfer belt 10 toward the photosensitive drum 1*a*. In a case where the transfer current becomes further excessive, electric discharge may occur between the intermediate transfer belt 10 and the photosensitive drum 1*a* at a portion upstream of the primary transfer portion N1*a* in the moving direction of the intermediate transfer belt 10. In this case, the image obtained after the image forming process may have image defects due to toner scattering or electric discharge patterns.

More specifically, in a case where the interference current from the secondary transfer roller 20 flows into the primary transfer portion N1*a*, the transfer current deviates from the appropriate primary transfer current value, so that the transfer efficiency may be degraded or image defects may occur. Further, in the secondary transfer control, the interference current changes with change in the applied voltage at the secondary transfer portion N2. Thus, the primary transfer may be affected by the secondary transfer control and become unstable.

In contrast, in the configuration of the present exemplary embodiment in FIGS. 5A and 6A, the resistance of the surface layer 10*b* is higher than that of the base layer 10*a*. Thus, the current $I_d$ flows in the base layer 10*a* not in the front surface of the intermediate transfer belt 10 in contact with the photosensitive drum 1*a*. The current $I_d$ flows along the rotational direction R2 of the intermediate transfer belt 10 and then reaches the vicinity of the primary transfer portion N1*a*. Here, the surface layer 10*b* having a high resistance serves as a high-resistance $R_{Vb}$, so that the current $I_d$ is divided into a component $I_{d\_t1}$ flowing in the photosensitive drum 1*a* and a component $I_{d\_GND}$ flowing in the primary transfer roller 6*a*, as illustrated in a current path AA. More specifically, the interference current that affects the primary transfer is the current $I_{d\_t1}$ which is a part of the current $I_d$, thus producing an effect of decreasing the interference current.

Here, the interference current $I_{d\_t1}$ can be represented by the following equation (2) by solving the equivalent circuit in FIG. 6A.

$$I_{d\_t1}=(V_{t2}'\times R_{offset}/(R_{sa}+R_{offset})-V_{t1})/R_{Vb} \tag{2}$$

As indicated in the equation (2), the current $I_{d\_t1}$ changes by the resistance value of the intermediate transfer belt 10, the primary transfer voltage $V_{t1}$, and the distance Dd. In particular, the resistance $R_{Vb}$ of the surface layer 10*b* largely affects the current $I_{d\_t1}$. More specifically, increasing the electrical resistance of the surface layer 10*b* of the intermediate transfer belt 10 enables effectively reducing the current $I_{d\_t1}$. To increase the electric resistance of the surface layer 10*b* of the intermediate transfer belt 10, it is effective to reduce the content of the conducting agent contained in the surface layer 10*b*. Reducing the content of the conducting agent to be applied to the surface layer 10*b* of the intermediate transfer belt 10 increases the surface resistivity ρs1 of the front surface (outer circumferential surface) of the intermediate transfer belt 10.

The electrical resistance of the surface layer 10*b* has a high correlation with the surface resistivity ρs1 of the front surface of the intermediate transfer belt 10. Thus, it is desirable to use the surface resistivity ρs1 as a management parameter.

Increasing the surface resistivity ρs2 of the back surface (inner circumferential surface) of the intermediate transfer belt 10 reduces the current component $I_{d\_GND}$ passing through the current path AA and flowing in the primary transfer roller 6*a*. At this time, the component $I_{d\_t1}$ flowing in the photosensitive drum 1*a* which serves as an interference current increases, possibly resulting in the excessive transfer current. More specifically, to prevent image defects caused by the above-described current interference, it is effective to set the resistance value of the surface layer 10*b* of the intermediate transfer belt 10 to a high value relative to that of the base layer 10*a*. In other words, increasing the ratio of the surface resistivity of the surface layer 10*b* of the intermediate transfer belt 10 to that of the base layer 10*a* thereof, ρs1/ρs2, as the management parameter, enables preventing image defects possibly caused by the current interference.

In contrast, the primary transfer efficiency is determined by the amount of current flowing in the photosensitive drum 1*a* via the primary transfer portion N1*a*. If the volume resistivity and/or surface resistivity of the intermediate transfer belt 10 are(is) increased to achieve an appropriate primary transfer process, and accordingly a high primary transfer voltage is to be set. The current $I_{d\_t1}$ can be decreased by simply increasing the volume resistivity of the intermediate transfer belt 10. However, setting the primary transfer voltage to a high value may possibly increase the current $I_{d\_t1}$. Thus, in the present exemplary embodiment, it is desirable to set the volume resistivity ρv to an intermediate resistance region to be used as an intermediate transfer member, in other words, a range from $5\times10^{7}$ (Ω·cm) to $2\times10^{11}$ (Ω·cm) (inclusive).

As described above, in the configuration of the present exemplary embodiment, the ratio of the surface resistivity, ρs1/ρs2, is set within a predetermined range to prevent the interference current from flowing from the secondary transfer portion N2 toward the photosensitive drum 1*a* via the primary transfer portion N1*a* near the secondary transfer portion N2.

<Setting ρs1/ρs2>

A preferred relation between the surface resistivities ρs1 and ρs2 will be described in detail below. To achieve the optimum primary transfer according to the present exemplary embodiment, the optimum transfer current to be applied to the primary transfer portion N1*a* is to be determined, initially. The desired transfer current is settable by applying the primary transfer current in the primary transfer portion N1*a* in a state where no voltage is applied from the secondary transfer power source 21, and checking the efficiency of the toner image transfer from the photosensitive drum 1*a* to the intermediate transfer belt 10. The setting of the primary transfer current will be described below with reference to FIG. 3.

An ammeter (not illustrated) which is a current detection unit is disposed between the primary transfer power source 23 and the photosensitive drum 1*a* illustrated in FIG. 3. The primary transfer process is then performed while varying the output from the primary transfer power source 23. The image forming operation is stopped during the primary transfer process, and residual toner on the surface of the photosensitive drum 1*a* after the toner image has passed through the primary transfer portion N1*a* is collected by sticking an adhesive tape onto the photosensitive drum 1*a*. The visual evaluation was performed for the residual toner collected with the tape based on three different residual levels (A, B, and C). Table 1 illustrates results of the visual evaluation. For the level "A", almost no residual toner adhering to the tape is visually recognizable. For the level "B", residual toner adhering to the tape is visually recognizable but the amount of residual toner is small and permissible in the image forming process. For the level "C", a large amount of residual toner is present and the reduced density of the obtained image is visually recognizable by the user. According to the present exemplary embodiment, the image forming process and evaluation were performed by using black toner to make it easier to visually recognize residual toner.

TABLE 1

Results of Visual Evaluation for Residual Toner Corresponding to Primary Transfer Current

| Primary Transfer Voltage [V] | 600 | 800 | 1000 | 1200 | 1400 | 1600 | 1800 |
|---|---|---|---|---|---|---|---|
| Primary Transfer Current [μA] | 3.8 | 5.5 | 9.0 | 13.0 | 16.5 | 20.6 | 27.1 |
| Visual Evaluation Result for Residual Toner | C | C | B | A | B | C | C |

As illustrated in Table 1, the residual toner decreased with increasing value of the primary transfer current, and a tendency of favorable results for the visual evaluation was observed. This is because, if the primary transfer current is too small, the current for transferring the toner image carried on the photosensitive drum 1*a* to the intermediate transfer belt 10 is insufficient, which increases the amount of residual toner. Meanwhile, for the primary transfer current of 13.0 μA, almost no residual toner was visually recognized. However, increasing the primary transfer current increased the amount of the residual to degrade the transfer efficiency. This is because, if the primary transfer current is too large, electric discharge occurs in the primary transfer portion N1*a* to reverse the toner polarity, resulting in residual toner on the photosensitive drum 1*a*. More specifically, in the configuration of the image forming apparatus 100 according to the present exemplary embodiment, we found in this examination that the suitable primarily transfer current to be applied in the primary transfer portion N1 was 13.0 μA to perform the optimum primary transfer.

Subsequently, as targets of the comparison with the intermediate transfer belt 10 according to the present exemplary embodiment, we prepared seven intermediate transfer belts for the first and the second comparative examples and the first to the fifth modifications of the present exemplary embodiment, performed the image forming operation, and performed various evaluations. The intermediate transfer belt for the first comparative example is a single-layer intermediate transfer belt. We prepared the belt by using polyimide as the main raw material and, to obtain a desired electrical resistance, distributed carbon black as a conducting agent. While intermediate transfer belts for the second comparative example and the first to the fifth modifications are made of the same materials as the intermediate transfer belt 10 according to the present exemplary embodiment, we prepared the intermediate transfer belts having different resistance values by changing the content of the conducting agent.

For the single-layer intermediate transfer belt used in the first comparative example, the surface resistivity measured from the outer circumferential surface is the same as that measured from the inner circumferential surface. For the two-layer intermediate transfer belts used in the second comparative example and the modifications, the surface resistivity measured from the outer circumferential surface is larger than that measured from the inner circumferential surface, as illustrated in Table 2 (described below).

We performed the image forming process by using the intermediate transfer belts in the present exemplary embodiment, the first and the second comparative examples, and the first to the fifth modifications, and evaluated the primary transfer efficiency, the density of the test image secondarily transferred to the transfer material, and the occurrence of a secondary transfer memory. Table 2 illustrates results of the evaluations. In the image forming operation for the following evaluations, the primary transfer voltage was determined by performing a predetermined control sequence so that the target current of 13.0 μA flowed as the primary transfer current. In the primary transfer process during the image forming process, constant-voltage control was performed by using the primary transfer voltage determined in the above-described control sequence. In the secondary transfer process, constant-current control was performed so that an appropriate current flowed in the secondary transfer portion N2.

As in the evaluation corresponding to the results in Table 1, we evaluated the primary transfer efficiency by forcibly stopping the image forming operation in the primarily transfer, collecting the residual toner on the photosensitive drum 1*a* by using an adhesive tape, and visually checking the amount of residual toner. We also evaluated the residual toner based on the same evaluation criteria (three different levels A, B, and C) in Table 1. The primary transfer portions N1 subjected to the evaluation include the primary transfer portion N1*a* near the secondary transfer portion N2 and a primary transfer portion N1*b* hardly affected by the current interference from the secondary transfer portion N2. In the evaluation environment, the temperature was set to 23° C. and the humidity to 50%.

In the evaluation for the density of the test image secondarily transferred to the transfer material, plain paper CS-680 from Canon was used as the transfer material, and a 5×5 mm yellow square patch image formed by using the image forming unit Sa was used as the test image. We performed the evaluation by forming the test image on the transfer material and measuring the optical reflection density of the test image after the secondary transfer. EXACT BASIC from X-Rite, Inc. was used to measure the optical reflection density.

The secondary transfer memory which is an evaluation item in Table 2 refers to a residual electrostatic latent image corresponding to the image pattern secondarily transferred to the transfer material at the secondary transfer portion N2, remaining on the intermediate transfer belt 10 as a trace. If a secondary transfer memory occurs, image defects may possibly occur depending on image forming conditions, for example, when a subsequent image is formed at the position where a secondary transfer memory has occurred in a continuous image forming process. More specifically, an image defect becomes revealed as a phenomenon where, when the intermediate transfer belt 10 with a secondary transfer memory formed thereon rotates one round and reaches the secondary transfer portion N2 again, the density of subsequent images decreases. In particular, an image defect is likely to occur with the high surface resistivity of the outer circumferential surface of the intermediate transfer belt 10.

TABLE 2

Results of Various Evaluations on First Exemplary Embodiment, First and Second Comparative Examples, And First to Fifth Modifications

| | Volume Resistivity | Surface Resistivity | | |
|---|---|---|---|---|
| | ρv | ρs1 | ρs2 | ρs1/ρs2 |
| First Exemplary Embodiment | $2.50 \times 10^{10}$ | $2.20 \times 10^{11}$ | $5.00 \times 10^{9}$ | 44.0 |
| First Comparative Example | $5.90 \times 10^{9}$ | $1.05 \times 10^{10}$ | $1.05 \times 10^{10}$ | 1.0 |
| Second Comparative Example | $3.21 \times 10^{10}$ | $1.98 \times 10^{10}$ | $1.50 \times 10^{10}$ | 1.3 |
| First Modification | $2.74 \times 10^{10}$ | $1.98 \times 10^{10}$ | $1.31 \times 10^{10}$ | 1.5 |
| Second Modification | $2.30 \times 10^{10}$ | $1.98 \times 10^{10}$ | $1.09 \times 10^{10}$ | 1.8 |
| Third Modification | $1.70 \times 10^{11}$ | $1.10 \times 10^{11}$ | $5.00 \times 10^{10}$ | 2.0 |
| Fourth Modification | $4.46 \times 10^{10}$ | $5.06 \times 10^{11}$ | $5.00 \times 10^{9}$ | 100.0 |
| Fifth Modification | $4.26 \times 10^{10}$ | $5.06 \times 10^{11}$ | $4.00 \times 10^{9}$ | 130.0 |

| | Image Forming Unit Sa (Yellow) | | | Image Forming Unit Sb (Magenta) |
|---|---|---|---|---|
| | Primary Transfer Efficiency | Density Of Test Image | Occurrence Of Secondary Transfer Memory | Primary Transfer Efficiency |
| First exemplary embodiment | A | 1.44 | Absent | A |
| First comparative example | C | 1.20 | Absent | A |
| Second comparative example | C | 1.38 | Absent | A |
| First modification | B | 1.42 | Absent | A |
| Second modification | B | 1.44 | Absent | A |
| Third modification | A | 1.43 | Absent | A |
| Fourth modification | A | 1.45 | Absent | A |
| Fifth modification | A | 1.43 | Present | A |

Initially, density evaluation results for the test image will be described below. In the examination of the present exemplary embodiment, we visually recognized that the threshold value of the optical reflection density for determining the density reduction was 1.40 and that the density lower than the threshold value was determined to be a density reduction. In the above-described examination, the density is determined to be suitably controlled in the secondary transfer process, and the density variation in the evaluation results is caused by the primary transfer process. In the first and the second comparative examples, a density reduction of the test image became reveled; however, the density reduction of the test image did not occur in the first to the fifth modifications. Further, the image forming unit Sb for magenta that is hardly affected by the interference current from the secondary transfer portion N2 provided a favorable primary transfer efficiency in all of the above-described configurations.

As for the primary transfer efficiency, while the first and the second comparative examples resulted in a large amount of residual toner and the evaluation level C, the first to the fifth modifications resulted in an amount of residual toner within the permissible range. In particular, the third to the fifth modifications provided a favorable primary transfer efficiency.

In view of the above-described results, it is desirable that ρs1/ρs2 satisfies the following inequality (3) to prevent the occurrence of image defects in primarily transferring the toner image from the image carrier to the intermediate transfer member.

$$\rho s1/\rho s2 \geq 1.5 \quad (3)$$

If ρs1/ρs2 satisfies the following inequality (4), further favorable primary transfer efficiency can be achieved. For example, if a sufficient capacity of the drum cleaning unit **5*a*** cannot be allocated because of product dimensions, the amount of residual toner can be further reduced by satisfying the inequality (4).

$$\rho s1/\rho s2 \geq 2.0 \quad (4)$$

The fifth modification provides a large value of ρs1/ρs2, in other words, a large difference between the surface resistivity ρs1 of the outer circumferential surface of the intermediate transfer belt 10 and the surface resistivity ρs2 of the inner circumferential surface thereof. Thus, the occurrence of a secondary transfer memory was observed with this modification. It is desirable that the following inequality (5) is satisfied to prevent the occurrence of a secondary transfer memory which is a cause of image defects in the secondary transfer process.

$$\rho s1/\rho s2 \leq 100.0 \quad (5)$$

<Disposal Relation Between Photosensitive Drum **1*a* and Primary Transfer Roller 6**>

As described above, if ρs1/ρs2 satisfies the inequality (3), the configuration in the present exemplary embodiment enables preventing the occurrence of image defects in primarily transferring the toner image from the photosensitive drum **1*a* to the intermediate transfer belt 10. A description will be provided of the appropriate distance Dd from the rotation center Rdc of the photosensitive drum 1*a* to the rotation center Rtr of the primary transfer roller 6**.

The resistance $R_{offset}$ changes when the distance Dd changes. That the current $I_{d\_t1}$ changes when the resistance $R_{offset}$ changes is seen from the equation (2). If the distance Dd increases, the resistance $R_{offset}$ also increases, resulting in increase in the component $I_{d\_t}$ of the interference current. If the distance Dd increases, the voltage $V_{t1}$ (negative polarity) is to be increased to apply an appropriate primary transfer current according to the value of the distance Dd. The component $I_{d\_t}$ of the interference current then further increases.

We evaluated the primary transfer efficiency with the value of the distance Dd changed, using the intermediate transfer belts according to the present exemplary embodiment, the second comparative example, and the first to the fifth modifications. We compared the distance Dd with six different values 1 mm, 3 mm, 5 mm, 7 mm, 10 mm, and 13 mm, which include 3.0 mm according to the configuration of the present exemplary embodiment. D=1.0 mm is the shortest distance Dd for stably forming the primary transfer nip portion in consideration of the clearance of mechanical dimensions in the configuration of the present exemplary embodiment. The target current for the primary transfer is 13.0 μA. We used the same evaluation method and the same evaluation environment as those in the evaluation of the primary transfer efficiency in Table 2. Evaluation results are illustrated in Table 3.

TABLE 3

| Results of Evaluation for Primary Transfer Efficiency at Distance Dd | | | | | | |
|---|---|---|---|---|---|---|
| | | Primary Transfer Efficiency | | | | |
| | ρs1/ρs2 | Dd = 1[mm] | Dd = 3[mm] | Dd = 5[mm] | Dd = 7[mm] | Dd = 10[mm] |
| First Exemplary Embodiment | 44.0 | A | A | A | A | B |
| Second Comparative Example | 1.3 | C | C | C | C | C |
| First Modification | 1.5 | B | B | B | B | B |
| Second Modification | 1.8 | A | B | B | B | B |
| Third Modification | 2.0 | A | A | A | B | B |
| Fourth Modification | 100.0 | A | A | A | A | B |
| Fifth Modification | 130.0 | A | A | A | A | A |

As illustrated in Table 3, there was a tendency that the primary transfer efficiency decreases with increasing distance Dd.

In a case where the intermediate transfer belt 10 according to the present exemplary embodiment was used, the primary transfer efficiency was favorable with the distance Dd of up to 7 mm and was within the permissible range, without influence on the image with the distance Dd of 10 mm. As described above, it is desirable to set the distance Dd to 10.0 mm or less. In the configuration of the present exemplary embodiment, it was found that setting the distance Dd to 7 mm or less enabled obtaining a higher primary transfer efficiency.

<Controlling Developing Potential>

The output value of the negative voltage $V_{t1}$ to be applied to the photosensitive drum 1*a* in the primary transfer process may be changed according to environmental variations, such as temperature and humidity variations, and the operating life of the cartridge. In such a case, according to this change, the potential (dark portion potential Vd') formed on the photosensitive drum 1*a* by the charge roller 2 or the developing potential Vdc' to be applied to the developing roller 42 may be changed. For example, in a case where the relation represented by the following equation (6) is satisfied, where $V_{t1}'$ denotes the primary transfer voltage after the change and $\Delta V_{t1}$ denotes the variation of the primary transfer voltage after the change, it is desirable to change the values of the dark portion potential Vd' and the developing potential Vdc' of the photosensitive drum 1*a* as expressed by equations (7) and (8). The photosensitive drum 1*a* is uniformly charged. Referring to the equation (7), the dark portion potential Vd denotes the dark portion potential of the photosensitive drum 1*a* corresponding to the voltage $V_{t1}$ before being changed to the voltage $V_{t1}'$. Referring to the equation (8), the developing potential Vdc is the developing potential corresponding to the voltage $V_{t1}$ before being changed to the voltage $V_{t1}'$.

$$\Delta V_{t1}=V_{t1}'-V_{t1} \quad (6)$$

$$Vd'=Vd+\Delta V_{t1} \quad (7)$$

$$Vdc'=Vdc+\Delta V_{t1} \quad (8)$$

The foregoing is a description of changing the primary transfer voltage according to environmental variations, such as temperature and humidity variations, and the operating life of the cartridge, and accordingly changing the developing potential and the dark portion potential of the photosensitive drum 1*a*. Alternatively, change targets are not limited to the developing potential and the dark portion potential but may include the light portion potential which is changed by changing the amount of laser beam.

While the present exemplary embodiment has been described above using a two-layer intermediate transfer belt as an example, an intermediate transfer belt formed of three or more layers is also applicable as long as the ratio of the surface resistivity from the outer circumferential surface to the surface resistivity from the inner circumferential surface satisfies the relation represented by the equation (2). A single-layer intermediate transfer belt made of the same base material and the same conducting agent material is also applicable. In this case, the surface resistivity is differentiated between the front and back surfaces by differentiating the conducting agent, for example, by using different density or distribution state of carbon black.

Although the present exemplary embodiment has been described using a metal roller as the primary transfer roller as an example, a general rubber roller formed of a metal shaft coated by an elastic material (elastic layer), such as rubber, is also applicable. When using a rubber roller as the primary transfer roller, it may be disposed right under the photosensitive drum 1*a* with the intermediate transfer belt 10 therebetween. In this case, the relation represented by the inequality (1) does not need to be satisfied.

A second exemplary embodiment of the present disclosure will be described below. An intermediate transfer belt 110 according to the second exemplary embodiment differs from the intermediate transfer belt 10 according to the first exemplary embodiment in that the contact resistance between the photosensitive drum 1*a* and the intermediate transfer belt 110 is changed by controlling the surface roughness of the intermediate transfer belt 110 by applying predetermined groove profiles to the outer circumferential surface. In the following descriptions, only configurations different from those according to the first exemplary embodiment will be described below, and descriptions of configurations common to those according to the first exemplary embodiment will be omitted.

Figure 7:
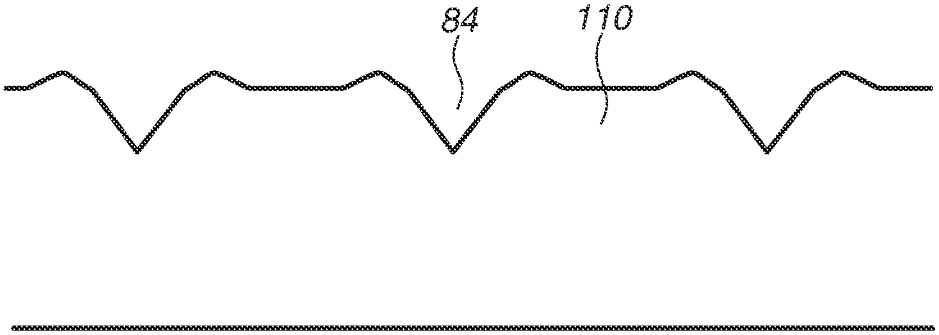
FIG. 7 is a sectional view illustrating a vicinity of the surface of an intermediate transfer belt having been subjected to roughening process according to a second exemplary embodiment.

FIG. 7 is a sectional view schematically illustrating the structure of the intermediate transfer belt 110 according to the present exemplary embodiment. As illustrated in FIG. 7, the intermediate transfer belt 110 according to the present exemplary embodiment has a single-layer structure and is provided with groove profiles on the outer circumferential surface by using the mold transfer (imprint processing). More specifically, the surface profile of the intermediate transfer belt 110 according to the present exemplary embodiment is formed by pressing a mold (not illustrated) having minute uneven shape onto the intermediate transfer belt 110 to transfer the minute uneven shape of the mold to the front surface of the intermediate transfer belt 110. Through the mold transfer processing, grooves (groove profile or groove portions) 84 are formed on the outer circumferential surface of the intermediate transfer belt 110 along the moving direction of the intermediate transfer belt 110. A groove 84 lies in the entire circumferential area of the intermediate transfer belt 110 along the moving direction of the intermediate transfer belt 110. A plurality of the grooves 84 is formed in the width direction orthogonal to the moving direction of the intermediate transfer belt 110. Thus, the intermediate transfer belt 110 according to the present exemplary embodiment is configured so that the surface roughness on the outer circumferential surface provided with groove profiles is larger than the surface roughness on the inner circumferential surface.

The surface profile of the intermediate transfer belt 110 is able to be managed, for example, based on a surface roughness Rzjis. The surface roughness is measured by using the Surface Roughness/Contour Profile Measuring Instrument SURFCOM 1500SD (from TOKYO SEIMITSU CO., LTD.) in conformance with JIS B0601:2001 under conditions of a cutoff wavelength of 0.25 mm, a measurement reference length of 0.25 mm, and a measurement length of 1.25 mm. The surface roughness Rzjis on the outer circumferential surface of the intermediate transfer belt 110 is measured by scanning the surface with the stylus of the measuring instrument in the direction substantially orthogonal to the moving direction of the intermediate transfer belt 110. The average of values measured at least five different positions is used as a management value. In consideration of the cleaning property of the belt cleaning unit 16 for the intermediate transfer belt 110, it is preferable that the roughness Rzjis of the intermediate transfer belt 110 is within a range from 0.26 μm to 0.67 μm, inclusive.

The contact area between the photosensitive drum 1*a* and the front surface of the intermediate transfer belt 110 with the grooves 84 provided in the front surface of the intermediate transfer belt 110 is smaller than the contact area without the grooves 84. When the contact area decreases, the contact resistance increases to increase the apparent electrical resistance on the outer circumferential surface of the intermediate transfer belt 110. Thus, providing the grooves 84 in the front surface of the intermediate transfer belt 110 enables controlling the contact resistance between the intermediate transfer belt 110 and the photosensitive drum 1*a*. More specifically, the ratio of the surface resistivity measured from the outer circumferential surface of the intermediate transfer belt 110 to the surface resistivity measured from the inner circumferential surface thereof is settable with the surface profiles and surface roughness of the intermediate transfer belt 110.

As described above, even with a single-layer intermediate transfer belt, controlling the surface profile and surface roughness of the intermediate transfer belt 110 enables setting ρs1/ρs2 described in the first exemplary embodiment to a desired range. This enables providing a favorable primary transfer efficiency and a favorable image quality, as in the first exemplary embodiment.

In the present exemplary embodiment, the mold transfer (imprint processing) is exemplified as a means for providing groove profiles to the front surface of the intermediate transfer belt 110. Alternatively, the intermediate transfer belt 110 may be subjected to roughening process by using sandpaper or wrapping paper. In molding the intermediate transfer belt 110, a method for providing predetermined profiles to the intermediate transfer belt 110 is also applicable. With this method, uneven shapes are provided in advance on the mold to be in contact with the front surface of the intermediate transfer belt 110.

While the present exemplary embodiment has been described about a configuration for providing groove profiles to a single-layer intermediate transfer belt, the present disclosure is not limited thereto. A specified surface resistivity ratio may be implemented in conformance with the electrical characteristics of the material by providing predetermined profiles to the front surface of the intermediate transfer belt 110.

A third exemplary embodiment will be described below with reference to FIGS. 8 and 9. A description will be provided of timings to apply voltages to the photosensitive drum 1*a* from the primary transfer power source 23 in the primary transfer process. Configurations and control according to the present exemplary embodiment are substantially similar to those according to the first exemplary embodiment except for timings to apply voltages to the photosensitive drum 1*a* from the primary transfer power source 23 and related potential control sequences. Accordingly, only configurations and control different from those according to the first exemplary embodiment will be described below, and descriptions of configurations and control common to those according to the first exemplary embodiment will be omitted.

In the primary transfer process, applying the primary transfer voltage to the photosensitive drum 1*a* from the primary transfer power source 23 in as short time as possible is advantageous to the operating lives of the photosensitive drum 1*a*, the intermediate transfer belt 10, and other components. More specifically, in the image forming operation, it is desirable to apply the primary transfer voltage as late as possible immediately before starting the primary transfer of the toner image from the photosensitive drum 1*a* to the intermediate transfer belt 10. This prevents the degradation of components due to electrical conduction and is desirable from the viewpoint of durability. The present exemplary embodiment is characterized in controlling the timing of applying the primary transfer voltage in synchronization with the timing when the toner image carried on the photosensitive drum 1*a* enters the primary transfer portion N1.

Figures 8A, 8B, 8C:
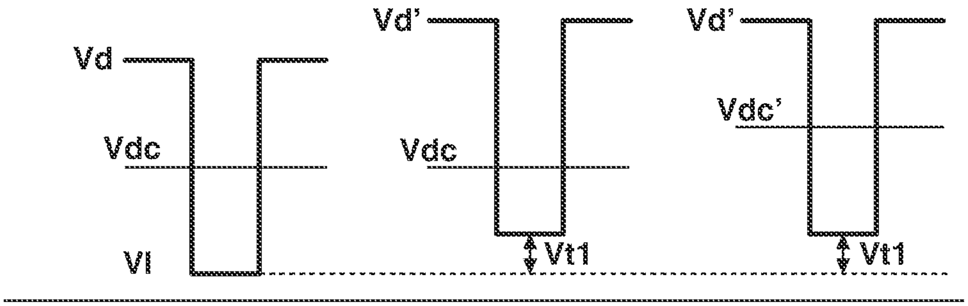
FIGS. 8A to 8C schematically illustrate various potential settings according to a third exemplary embodiment.

FIGS. 8A to 8C schematically illustrate different potential settings at any one of the image forming units S of the image forming apparatus 100 according to the present exemplary embodiment. FIG. 9 is a timing chart illustrating timings at which different potentials according to the present exemplary embodiment are formed. The horizontal and vertical axes schematically illustrate time and potential, respectively. The regular charge polarity of toner according to the present exemplary embodiment is the negative polarity. Thus, the dark portion potentials Vd (and Vd') formed on the photosensitive drum 1*a* by the charge roller 2, the developing potentials Vdc and Vdc') formed on the developing roller 42, and the primary transfer voltage $V_{t1}$ are all based on the application of negative voltages to these components. The absolute values of the above-described potentials are larger in order of Vd', Vd, Vdc', Vdc, and $V_{t1}$.

Figure 9:
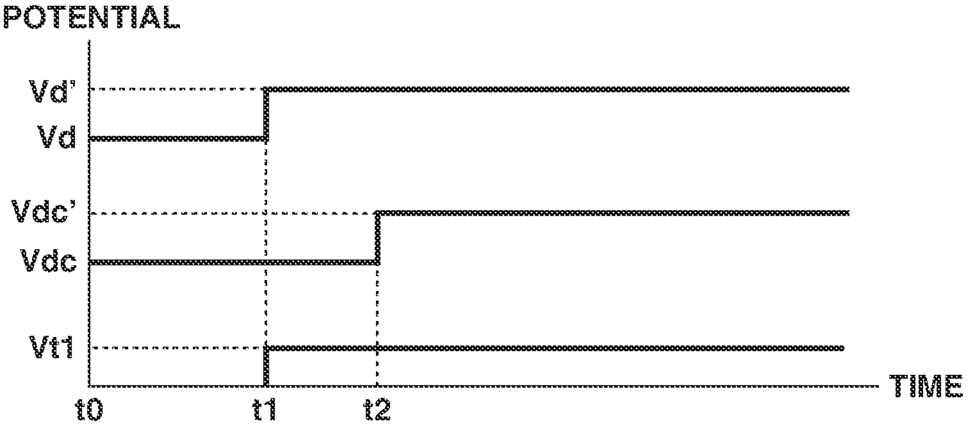
FIG. 9 is a timing chart illustrating various control according to the third exemplary embodiment.

As illustrated in FIG. 9, when a negative voltage is applied to the charge roller 2 from the charge power source 281 at time t0 which is the start timing of the image formation, the dark portion potential Vd is formed on the surface of the photosensitive drum 1*a*. At the time t0, the developing roller 42 is applied with the negative developing voltage from the developing power source 280, and the potential of the developing roller 42 becomes the developing potential Vdc.

At time t1, the leading end of the toner image carried on the photosensitive drum 1*a* (in the rotational direction of the photosensitive drum 1*a*) enters the primary transfer portion N1. At the time t1, the photosensitive drum 1a is applied with the primary transfer voltage $V_{t1}$ by the primary transfer power source 23.

FIG. 8A schematically illustrates relations between various potentials before the toner image carried on the photosensitive drum 1a enters the primary transfer portion N1 (between the time t0 and t1 in FIG. 9). Referring to FIG. 8A, before the time t1, the toner image carried on the photosensitive drum 1a has not yet reached the primary transfer portion N1 and therefore the primary transfer voltage $V_{t1}$ is not applied to the photosensitive drum 1a.

FIG. 8B schematically illustrates relations between various potentials in a state where the primary transfer voltage $V_{t1}$ is applied. At the time t1, the primary transfer voltage $V_{t1}$ is applied to the photosensitive drum 1a, so that the light portion potential V1 of the photosensitive drum 1a rises by about $V_{t1}$. At this timing, to maintain the potential difference between the dark portion potential Vd and the light portion potential V1 of the photosensitive drum 1a, the CPU 276 serving as a control unit performs control to cause the charge power source 281 to apply a voltage having a larger absolute value to the charge roller 2 to form the dark portion potential Vd' on the photosensitive drum 1a. According to the present exemplary embodiment, the dark portion potential Vd' is set to a value having an absolute value larger than that of the dark portion potential Vd by about $V_{t1}$.

FIG. 8C schematically illustrate relations between various potentials after time t2 when the position on the surface of the photosensitive drum 1a, charged to the dark portion potential Vd' by the output of the charge power source 281 being changed at the time t1, reaches the position facing the developing roller 42. As illustrated in FIG. 9, at the time t2, the CPU 276 changes the output from the developing power source 280 to the developing roller 42. Thus, the developing potential formed on the developing roller 42 is changed from the developing potential Vdc to the developing potential Vdc'. According to the present exemplary embodiment, the developing potential Vdc' is set to a value having an absolution value larger than that of the developing potential Vdc by about $V_{t1}$. After the time t2, the CPU 276 continues the image formation in a state where different potentials in FIG. 8C are formed. Performing this control enables maintaining the potential difference between the dark portion potential Vd' and the developing potential Vdc' of the photosensitive drum 1a almost equally to the potential difference between the dark portion potential Vd and the developing potential Vdc before time t2.

In the control according to the present exemplary embodiment, the primary transfer voltage $V_{t1}$ is applied from the primary transfer power source 23 to the photosensitive drum 1a when the toner image developed on the photosensitive drum 1a reaches the primary transfer portion N1. With the application of the primary transfer voltage $V_{t1}$, the CPU 276 controls the charge power source 281 and the developing power source 280 to changes the dark portion potential Vd and the developing potential Vdc, respectively. Thus, the CPU 276 maintains various potential differences before and after the application of the primary transfer voltage $V_{t1}$ to prevent the occurrence of failures in the charging and the developing processes.

While the primary transfer voltage $V_{t1}$ is applied to the photosensitive drum 1a at the time t1 when the leading end of the toner image carried on the photosensitive drum 1a enters the primary transfer portion N1 in the exemplary embodiment, the application timing of the primary transfer voltage $V_{t1}$ is not limited thereto. For example, the primary transfer voltage $V_{t1}$ may be applied before the time t1. In such a case, an appropriate primary transfer current is applicable in the primary transfer portion N1 before the toner image reaches the primary transfer portion N1. The configuration for applying the primary transfer voltage $V_{t1}$ at least after the time t0 enables preventing the degradation of components due to electrical conduction to a further extent than that in the configuration for applying the primary transfer voltage $V_{t1}$ at the time t0.

As described above, combining the configuration of the present exemplary embodiment with the configurations of the first and the second exemplary embodiments enables not only producing the effects obtained by the configurations of the first and the second exemplary embodiments but also preventing the degradation of components due to electrical conduction.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-154906, filed Sep. 28, 2022, which is hereby incorporated by reference herein in its entirety.

What is claimed is:

1. An image forming apparatus comprising:

an image carrier configured to carry a toner image;

an intermediate transfer member onto which the toner image carried on the image carrier is transferred, wherein the intermediate transfer member is rotatable and endless;

a primary transfer member configured to perform primary transfer of the toner image carried on the image carrier onto the intermediate transfer member, wherein the primary transfer member is disposed in a state where the primary transfer member is electrically grounded at a position corresponding to the image carrier across the intermediate transfer member;

a voltage application member configured to apply a voltage to the image carrier; and a secondary transfer member in contact with an outer circumferential surface of the intermediate transfer member, wherein the secondary transfer member is configured to perform secondary transfer of the toner image carried on the intermediate transfer member onto a transfer material, wherein the toner image carried on the image carrier is primarily transferred onto the intermediate transfer member in a state where the voltage application member applies the voltage to the image carrier, wherein the intermediate transfer member has a volume resistivity from $5\times10^{7}$ Ω·cm to $2\times10^{11}$ Ω·cm inclusive, and wherein a relation $\rho s1/\rho s2 \geq 1.5$ is satisfied, where ρs1 denotes a surface resistivity which is measured from the outer circumferential surface of the intermediate transfer member and ρs2 denotes a surface resistivity which is measured from an inner circumferential surface of the intermediate transfer member.

2. The image forming apparatus according to claim 1, wherein ρs1 and ρs2 satisfy a relation $\rho s1/\rho s2 \geq 2.0$.

3. The image forming apparatus according to claim 2, wherein ρs1 and ρs2 satisfy a relation $\rho s1/\rho s2 \leq 1.0\times10^{2}$.

4. The image forming apparatus according to claim 1, further comprising:

a charge member configured to charge a surface of the image carrier to form a predetermined potential on the surface of the image carrier;

a charge power source configured to apply a voltage to the charge member;

a developing member configured to develop an electrostatic latent image formed on the image carrier, by using toner;

a developing power source configured to apply a voltage to the developing member; and a control unit configured to control the charge power source and the developing power source, wherein, along with the voltage application member applying the voltage to the image carrier, the control unit changes the voltage to be applied from the charge power source to the charge member and the voltage to be applied from the developing power source to the developing member.

5. The image forming apparatus according to claim 1, wherein the intermediate transfer member includes at least two layers including a first layer disposed on a most inner circumferential surface and a second layer disposed on a most outer circumferential surface.

6. The image forming apparatus according to claim 5, wherein the first layer and the second layer are made of different materials.

7. The image forming apparatus according to claim 1, wherein a surface roughness of the outer circumferential surface of the intermediate transfer member is larger than a surface roughness of the inner circumferential surface of the intermediate transfer member.

8. The image forming apparatus according to claim 1, wherein the primary transfer member is a transfer roller having a surface formed of an elastic layer, such as rubber.

9. The image forming apparatus according to claim 1, wherein the primary transfer member is a transfer roller made of a metal.

10. The image forming apparatus according to claim 9, wherein a relation LC>(Da/2)+(Db/2)+TC is satisfied, where Da denotes a diameter of the image carrier, Db denotes a diameter of the transfer roller, Tc denotes a thickness of the intermediate transfer member, and Lc denotes a length of a straight line connecting a rotation center of the image carrier and a rotation center of the primary transfer member.

11. The image forming apparatus according to claim 10, wherein, when viewed from a rotational axis direction of the image carrier, a distance from the rotation center of the image carrier to the rotation center of the primary transfer member in a moving direction of the intermediate transfer member is 10 mm or less.

12. The image forming apparatus according to claim 10, wherein, when viewed from a rotational axis direction of the image carrier, a distance from the rotation center of the image carrier to the rotation center of the primary transfer member in a moving direction of the intermediate transfer member is 7.0 mm or less.

13. The image forming apparatus according to claim 1, wherein a rotation center of the primary transfer member is located downstream of a rotation center of the image carrier in a rotational direction of the intermediate transfer member at a position where the image carrier and the intermediate transfer member are in contact with each other.

* * * * *